(No Model.) 4 Sheets—Sheet 3.
E. V. R. GARDNER.
HAY OR STRAW GRAPPLING FORK.
No. 384,970. Patented June 26, 1888.
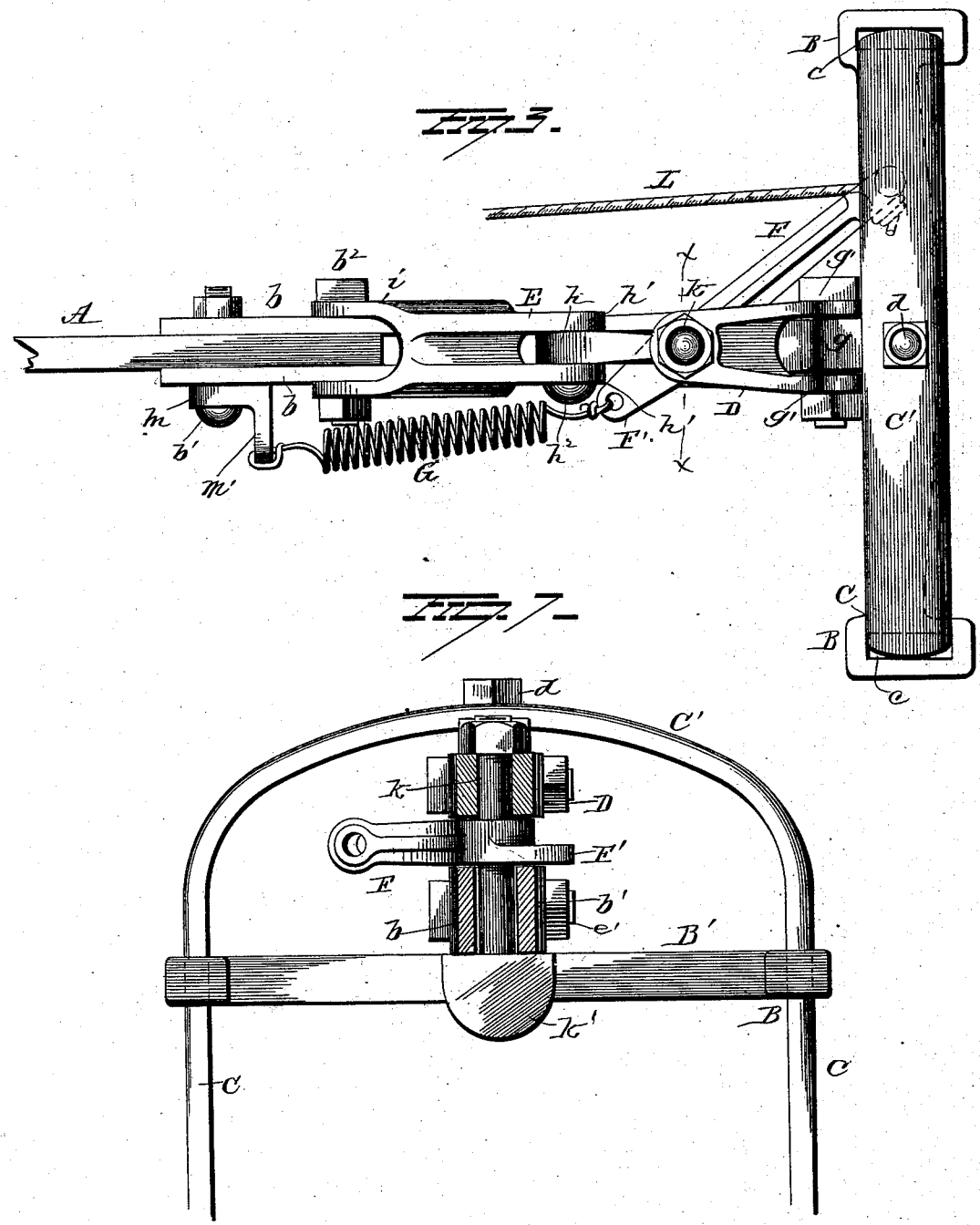
Witnesses:
E. L. Nottingham
G. F. Downing
Inventor:
E. V. R. Gardner
By his Attorney
H. A. Seymour (No Model.) 4 Sheets—Sheet 4.
E. V. R. GARDNER.
HAY OR STRAW GRAPPLING FORK.
No. 384,970. Patented June 26, 1888.
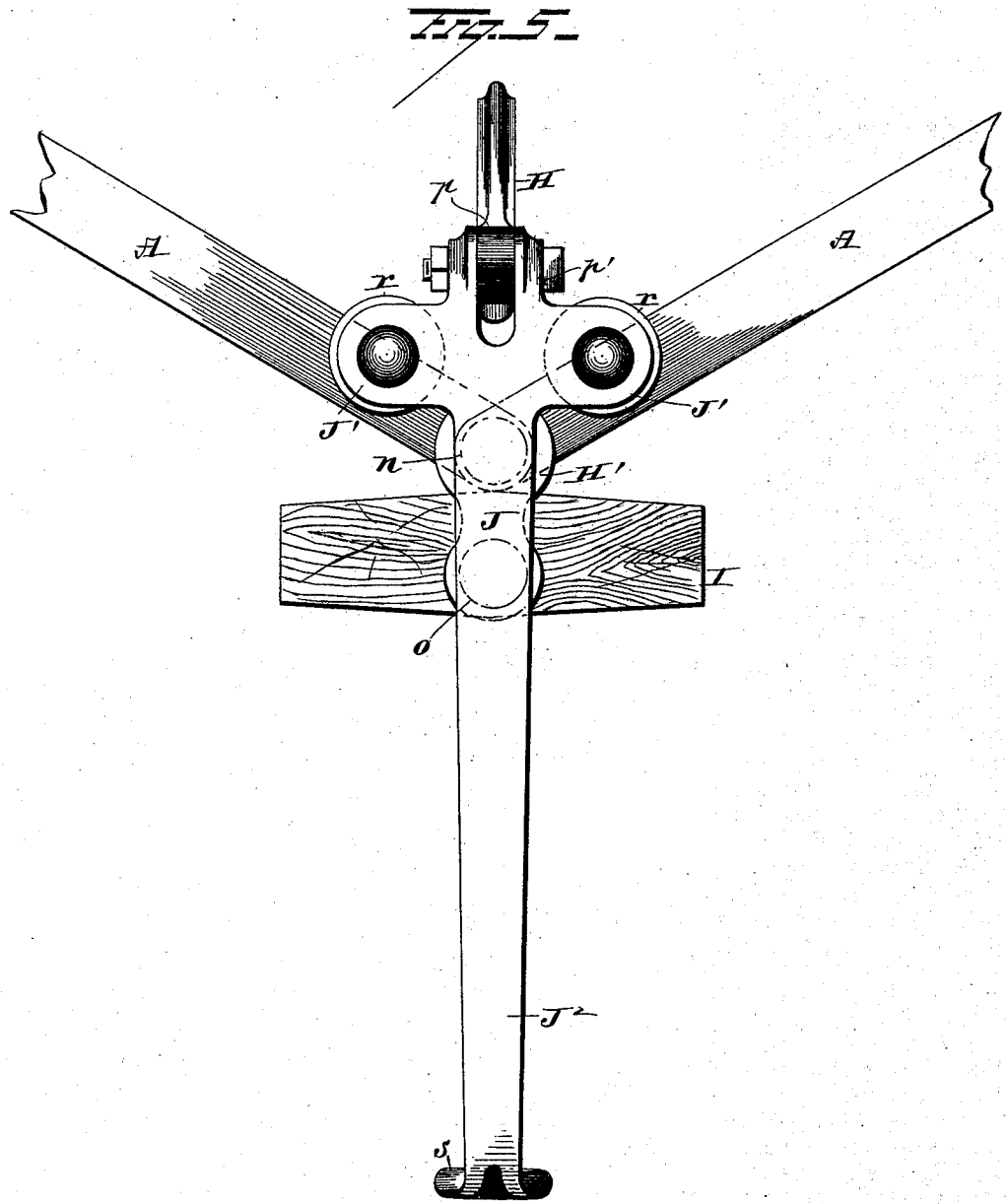
Witnesses
G. J. Nottingham.
G. F. Downing.
Inventor
E. V. R. Gardner.
By his Attorney
H. A. Suzman.

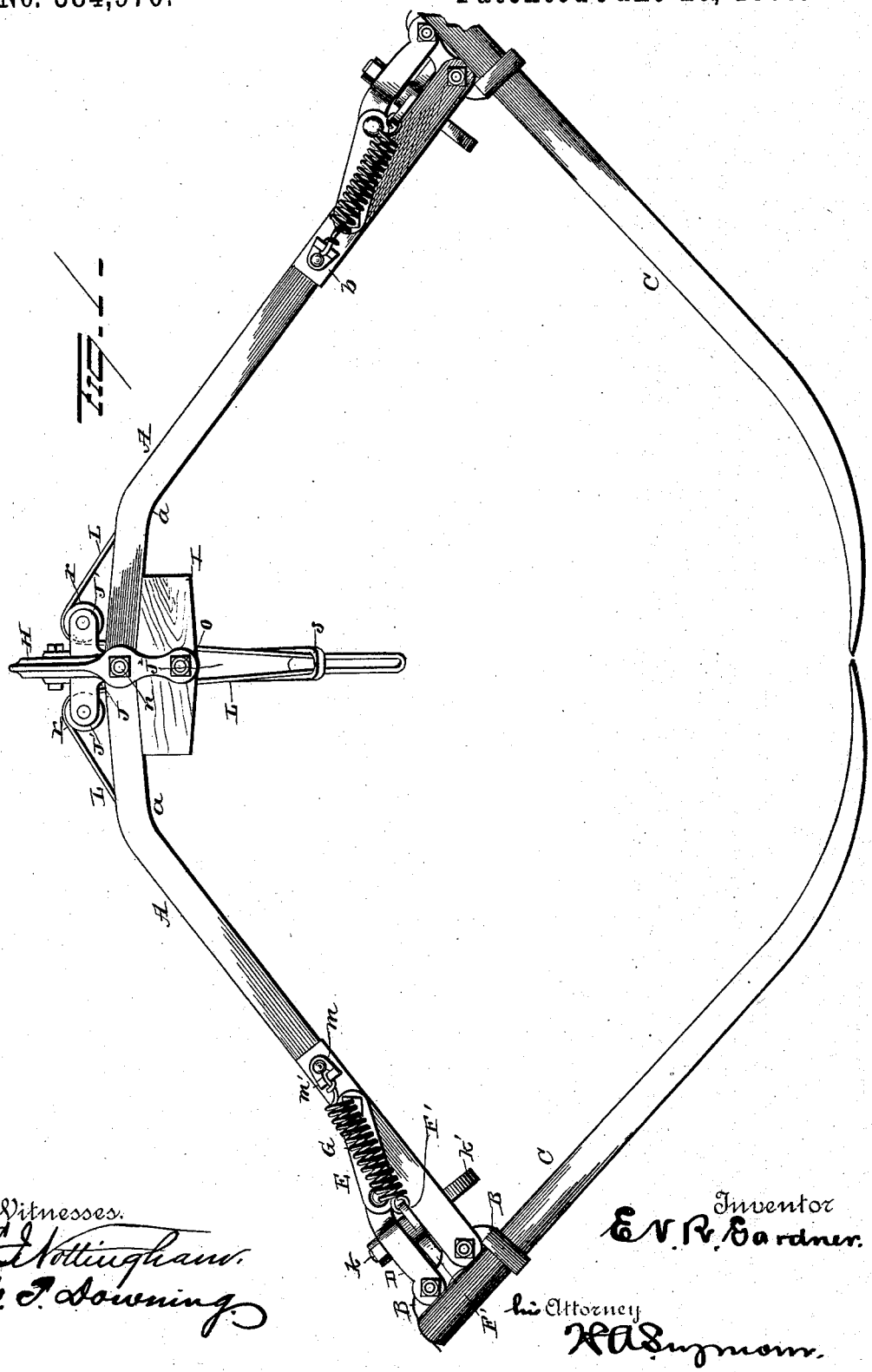

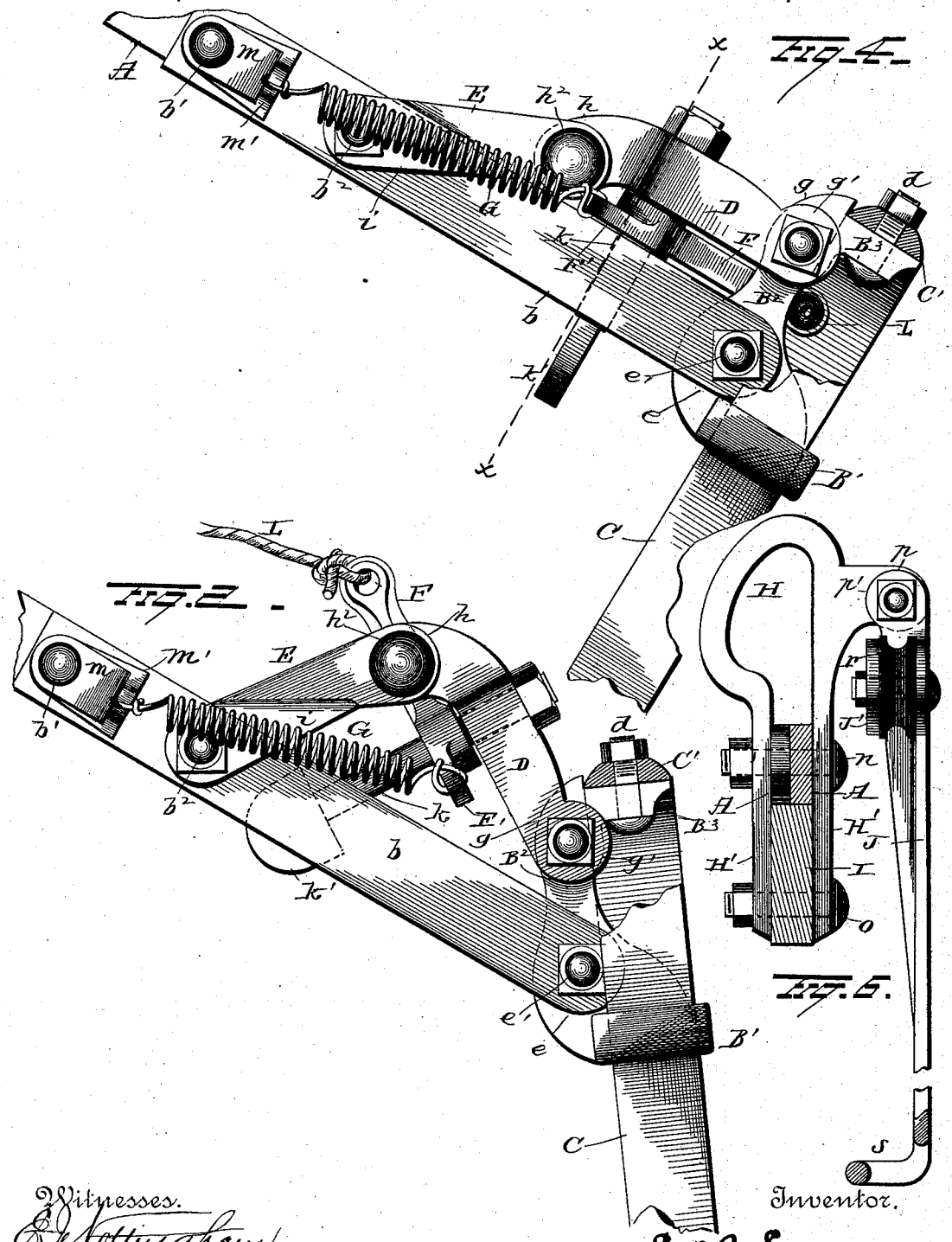

UNITED STATES PATENT OFFICE.

EMMET V. R. GARDNER, OF WEST TOWN, NEW YORK.

HAY OR STRAW GRAPPLING FORK.

SPECIFICATION forming part of Letters Patent No. 384,970, dated June 26, 1888.

Application filed December 28, 1887. Serial No. 259,243. (No model.)

*To all whom it may concern:*

Be it known that I, EMMET V. R. GARDNER, of West Town, in the county of Orange and State of New York, have invented certain new and useful Improvements in Hay or Straw Grappling Forks; and I do hereby declare the following to be a full, clear, and exact description of the invention, such as will enable others skilled in the art to which it appertains to make and use the same.

My invention relates to an improvement in grappling hay or straw forks that are operated by suitable power.

The object of my present invention is to improve the details of construction of a device of this character, so as to provide a simple and efficient grappling-fork which will be reliable in operation, have few working parts, be strong and not liable to breakage, and that may be manufactured at a low initial cost.

With these objects in view my invention consists in certain features of construction and combinations of parts, that will be hereinafter described, and pointed out in the claims.

Referring to the drawings making a part of this specification, Figure 1 represents the fork with its tines closed to retain a load between them. Fig. 2 is an enlarged side view of one of the fork-heads, showing the parts in open adjustment. Fig. 3 is an enlarged top view of one of the fork-heads, showing the relative positions assumed by the working parts when the fork is in closed adjustment. Fig. 4 shows a view of one of the fork-heads with the operating mechanism in a closed position. Fig. 5 represents an enlarged view of the suspending-clevis and an attached swinging bracket-arm. Fig. 6 is an enlarged view of the swinging bracket-arm that is attached to the clevis. Fig. 7 is a cross-section in elevation of the fork, taken through the line *x x* on Fig. 4.

In patents issued to me December 11, 1877, and March 1, 1887, an improved metallic head for holding the grappling-tines is shown, two pairs of tines being employed, each pair being bent from one bar of metal, the parallel tines of a pair being inserted through slots made in the ends of a cross-bar of the head, so as to retain the tines spaced apart, each pair of tines being held in place by a set-bolt inserted through the crown of the arch formed by bending a pair of tines from one piece, as stated. Each set-bolt inserted through the central point between a pair of tines engages a rib of metal that projects vertically from the cross-bars mentioned, so that light strong skeleton heads and a firmly-secured pair of tines are afforded by such a plan of construction. I utilize the same form of tines and securing-heads in the fork which is the subject of my present invention as shown in Patent No. 358,738, but combine them with other novel features, that render the parts compact and easily manipulated to load or discharge the load, as will be made to appear in the following description of the construction and operation of the device. This grappling-fork is composed of two arms, which are pivoted together and by the same bolt to a clevis, each arm having a head and pair of tines affixed to its outer end, and as the construction of each arm with its tines and operating mechanism located in the heads is similar, a description of one-half of the fork will be understood as covering both main divisions.

In the drawings, A A are the arms of the fork, made of metal of proper length, with a bend made edgewise of their bodies at *a*, which causes a downward inclination of the arms, as shown in Fig. 1. Upon the end of one of the arms A two plates, *b*, are secured by bolts $b'$ $b^2$, inserted through holes made in the plates and arm, and as these plates are separated by the thickness of the arm a space of corresponding width intervenes between the plates from the end of the arm A outwardly.

The head-piece B is preferably constructed of cast metal, and consists of a cross-bar, B′, that has slots *c* formed in its ends to receive the parallel tines C, which are bent from a single piece of iron or steel. The bow or arch, C′, produced by this bending of the material to form parallel tines extends above the slotted ends of the cross-bar B′ and rests upon an arm, $B^2$, which projects from the top surface of the cross-bar B′ of the head B, and is also a part of this head. A set bolt or rivet, *d*, is inserted through a hole in the crown of the arch C′ into the outwardly-extended flange $B^3$ of the arm $B^2$, on which this arch rests, and the tines are in this manner held firmly in place. The tines are pointed in the usual manner, and may be tipped with tempered steel, if desired.

The preferred form of construction of the arch C′ is shown in Figs. 3 and 7, and consists in swaging or otherwise forming the material, so that it will be rounded on the top surface, and thus afford lightness as well as strength to the arch; or the material may be rendered convex on both the top and lower surfaces of the arched portion and attain equally good results with regard to strength and lightness of the same.

The vertical arm $B^2$ of head B is enlarged to produce a rounded boss, $e$, in its body near the point of junction of the arm with the crossbar $B'$, this boss being perforated to permit the head B and attached tines to be pivotally secured to the outer ends of the plates $b$, so that the tines and head may swing on this pivot-bolt $e'$. Another perforated boss, $g$, is formed in the arm $B^2$ above the boss $e$, and a link, D, which is bifurcated at one end, embraces loosely with its parallel jaws $g'$ the boss $g$. The terminations of these jaws are rounded and perforated to admit a bolt, which is inserted through the link-jaws $g'$ and the boss $g$ to pivot them together. The opposite end of the link D is reduced in thickness and ends in a rounded boss, $h$, which is centrally perforated and is in pivotal engagement with a crotched link, E, that has two parallel jaws, $h'$, formed on the end adjacent to the boss $h$, these jaws receiving the boss between them, a bolt, $h^2$, being inserted through holes made in the jaws that line with the perforations in the boss $h$. The crotched link E is further provided with two depending flanges, $i$, that are parallel to each other and such a distance apart as to fit loosely against the sides of the plates. These flanges, embracing the plates $b$, are pivoted in place by the bolt $b^2$, which passes through the plates and end of the arm A, as shown in Fig. 3.

It will be noticed in Fig. 2 that the swinging outwardly of the tines of the fork-head B will cause the inward vibration of the arched upper portion. $C'$, and consequently the two pivotal joints of the forked or crotched link E, together with the attached link D, will rock on their fulcrum bolts, and the joint formed by pivoting the boss $h$ and jaws $h'$ together will yield upwardly to permit such a vibration of the upper portion of the integral bow or arch of the tines C.

Near the center of the link D a perforation is made through it between the top and lower sides to admit a bolt. This bolt $k$ is inserted from the lower edges of the plates $b$ upwardly between them, and has a flattened head, $k'$, formed on the lower end, which is of such a relative thickness as to readily slide between the plates $b$ if its flattened sides are made to line with the inner surface of these parallel plates.

When the tines of the head B are in closed adjustment, as shown in Fig. 1, it will be seen that the point of pivotal attachment of the link D to the arm $B^2$ of the head B lies above the plane of the other end of this link, where it is loosely jointed to the forked link E, owing to a short bend of the link D near this joint-connection.

The bending of the link D in the manner just stated will afford a space between the upper edges of the parallel plates $b$ and the lower surface of the link.

Upon the bolt $k$, which, with its integral head $k'$, I designate as a "locking-bolt," an arm, F, is rigidly secured, which arm is located in the open slot or space afforded between the top edges of the plates $b$ and link D, and projects a proper distance at each side of this point of connection, producing a short limb, $F'$, and a longer arm, F, as shown plainly in plan view of the device.

A short pad, $m$, secured to the plate $b$ by the bolt $b'$, which is also used to hold the ends of the parallel plates $b$ upon the end of the arm A, as previously stated, is bent at a right angle to afford an ear, $m'$, that has a hole made in it near its outer edge to receive the extended looped end of a spiral spring-coil, G, which latter has its opposite end bent into a loop, also, to engage the perforated end of the short limb $F'$, that projects from the side of the locking-bolt $k$ at this side of the fork-head.

The tension of the spring-coil G is exerted by its manner of connection to hold the long arm F of the locking-bolt $k$, so that its outer end will lie toward and beneath the arch $C'$ of the tines C, the length of the arm F being preferably so proportioned to give it proper leverage.

When the long arm F is in the position just mentioned, it is important that the locking-head $k'$ of the locking-bolt $k$ shall be located across the space between the plates $b$, with its adjacent surface in contact with the lower edges of both of the plates, so that the joints of the pivoted link D and crotched link E will be held from yielding, and the fork-head B, with attached teeth C, will remain locked in closed adjustment as long as the head of the locking bolt $k$ is engaged with the plates $b$, as just explained. It is also apparent that if the bolt $k$ is turned to permit its head $k'$ to enter the space between the plates $b$ the weight of the tines of the head B will cause a vibration of the head, and the yielding of the joints of the link D and pivoted forked link E will draw the locking-head $k'$ upwardly between the plates $b$ when actuated by the gravity of the tines, causing them to assume a pendent position.

As previously indicated, the connected ends of the arms A A are lapped together and perforated to receive a pivot-bolt, $n$, which also passes through mating holes in the limbs of the bent loop or clevis H.

The chock-block I is secured between the lower ends of the limbs $H'$, and is intended to arrest the downward movement of the arms A A beyond a proper point, and the hole through which the bolt $o$ is inserted in it is made a proper distance from the upper edge of the block to insure this result. Each side of the point of connection of the block of the clevis H the top edge of the block is sloped downwardly, to afford a proper seat for the arms A A when the fork is in open adjustment.

The thickness of the chock-block I is such that the limbs of the clevis H will be held spaced apart sufficiently to permit the arms A A to vibrate freely between them on the pivot-bolt that secures them to the clevis.

Upon the side of the fork-clevis H a perforated ear, $p$, is formed for the reception of a bolt which passes through the jaws $p'$ and this ear. Said jaws, that loosely embrace the ear $p$, are integral extensions from the top edge of the pendent bracket-arm J, which is thus secured to swing loosely on the side of the clevis.

The bracket-arm J is intended to afford support for two loose grooved pulleys, $r$, which are pivoted to revolve freely between laterally-extended jaws $J'$ of the bracket arms. These pulleys, lying in the same vertical and horizontal planes, are located near the point of pivotal engagement of the bracket-arm J with the clevis-ear $p$.

From the lower portion of the joined pairs of jaws $J'$ the limb $J^2$ is extended a suitable length, and has an eye, $s$, formed upon its free extremity. Two cords or ropes, L, are attached by their ends to the ends of the arms F of the locking-bolts $k$, thence extended to lie in the grooves of the loose pulleys $r$, and through the leading eye $s$ on end of limb $J^2$ of bracket-arm J, thence to any convenient point within reach of the operator using the fork.

The provision of a pendent bracket-arm adapted to lead the tripping-ropes L to any point is an important feature of this invention, as it prevents any danger of fouling of the ropes and holds each separate and free to operate the arms to which they are attached simultaneously, which will discharge the load from the fork instantly at any point to which it has been transported after having been grappled.

In operation the fork is suspended by the clevis-loop H to any preferred traveling mechanism or devices that transport the hay or straw to the dumping-point, and the tripping-ropes pulled to release the locking-bolts $k$, which will place the tines C of the fork in the position shown in Fig. 2. The operator now grasps the fork-arms A and inserts them into a mass of hay or straw to be elevated, the weight of the fork aiding this operation. When the tines are fully embedded, the pressure upon the arms A will depress them at their center, so as to spread the heads B apart, and when they assume the position shown in Fig. 1 the locking-bolts $k$ will have been so depressed by the movement of attached parts that their heads $k'$ will be released from between the plates $b$. The spiral springs G will by their tension turn the bolts $k$ axially a proper distance to locate the locking-heads $k'$ at right angles to the sides of the plates $b$, thus locking the fork-tines below the load, which may be elevated and transported to any desired point and discharged, as previously explained.

It is not imperatively necessary for the proper action of this fork that the tines C be bent from one piece, although such a form of construction is preferred, as it is apparent that the cross-bars B' may have their slotted ends in which the tines are inserted made of such a length as to hold separate tines secured by a set-screw or other means, so that the connecting-arch C' of the tines of each head may be dispensed with.

As the arms A A may be provided with integral forked ends in lieu of the attached plates $b$ by casting or forging them in this form, I do not desire to confine myself to the use of the plates $b$, as described, to produce two parallel spaced ends at each outer terminal of the arms, both plans of construction being contemplated. Other slight changes might also be made in the constructive details of this fork without a departure from the spirit or scope of my invention; hence I do not wish to limit myself to the exact forms shown; but, Having fully described my invention, what I claim as new, and desire to secure by Letters Patent, is—

1. In a hay-fork, the combination, with a clevis, a pair of arms, and tines pivoted in the outer ends of the arms, of links loosely connecting the upper ends of the tines to the arms, and spring-actuated locking-bolts pivoted in two of the links and adapted to engage the arms, substantially as set forth.

2. In a hay-fork, the combination, with a clevis, a pair of arms pivoted therein, the outer ends of said arms being composed of parallel plates, and tines pivoted between the said plates, of links loosely connecting the upper ends of the tines with the arms, and spring-actuated locking-bolts pivoted in two of these links, each of these bolts having a head thereon adapted to pass between the plates of the arms and lock the tines in position.

3. In a hay-fork, the combination, with a clevis, a chock-block secured therein, a pair of arms pivoted above this block, the outer ends of said arms being composed of parallel plates, tines pivoted to the arms, and spring-actuated locking-bolts pivoted in two of the links and adapted by their engagement with the plates to lock the tines in position, of a swinging bracket pivoted to the clevis, said bracket having pulleys and an eye therein, and tripping-ropes attached to the locking-bolts, passing over the pulleys and through the eye in the swinging bracket, substantially as set forth.

4. In a hay-fork, the combination, with a clevis, two arms, two transverse heads having tines, and plates secured to the arms and pivoted to the heads, of spring-actuated locking-bolts located between the plates and provided with heads adapted to enter between and engage the under edges of the plates, and tripping-ropes to rock the locking-bolts and release the transverse heads, substantially as set forth.

5. In a hay-fork, the combination, with a clevis and two arms pivoted thereto, of two transverse heads, tines for each head, plates secured to the ends of the arms and pivoted upon the transverse heads, spring actuated locking-bolts that are located between the plates, with heads that are flattened to slide between the plates and lock under their edges, and tripping-ropes to rock the locking-bolts and secure or release the transverse heads and tines when these heads and tines are in position to lift a load of hay or straw or deposit it, substantially as set forth.

6. In a hay-fork, the combination, with two arms loosely connected, two plates affixed to the outer end of each arm, and two transverse heads provided with teeth and pivoted between the plates, of two links for each head, a spring actuated locking-bolt for each pair of links and pivoted to them, an arm affixed to each locking-bolt to rock them and lock or release the transverse heads and teeth, two ropes attached to the rocking arms to move them and the attached locking-bolts, and two springs connected so as to rotate the locking-bolts and lock their heads to the arm-plates when the strain on the tripping-ropes is released and the arms are depressed near their point of pivotal junction, substantially as set forth.

7. In a hay-fork, the combination, with two arms pivoted to a clevis and two plates affixed to the outer end of each arm so as to be spaced apart and parallel, of two transverse heads pivoted between the ends of the plates, two tines for each head, two links for each head that are jointed together and pivoted to the head and adjacent arm, a locking-bolt loosely secured to one of the links and adapted to be vertically reciprocated when the transverse heads are vibrated on their pivot-connections with the arm-plates, a rocking arm attached to each locking-bolt, two tripping-ropes that are connected to the ends of the rocking-arms, and two springs also attached to these arms to cause them to have locked contact with the arm-plates when the tines of the fork are in closed adjustment, substantially as set forth.

In testimony whereof I have signed this specification in the presence of two subscribing witnesses.

EMMET V. R. GARDNER.

Witnesses:
 J. HARVEY HANFORD,
 JOSEPH D. MCCOY.